(12) United States Patent
Park et al.

(10) Patent No.: US 7,700,206 B2
(45) Date of Patent: Apr. 20, 2010

(54) FUEL CELL SYSTEM

(75) Inventors: Myung-Seok Park, Gyeongsangnam-Do (KR); Kyu-Jung Kim, Gyeonggi-Do (KR); Myeong-Ho Lee, Busan (KR); Cheol-Hwan Kim, Gyeongsangnam-Do (KR); Yong-Jun Hwang, Gyeongsangnam-Do (KR); Seung-Tae Ko, Daegu (KR); Seong-Geun Heo, Busan (KR); Tae-Hee Cho, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 659 days.

(21) Appl. No.: 11/572,545

(22) PCT Filed: Aug. 17, 2004

(86) PCT No.: PCT/KR2004/002058

§ 371 (c)(1),
(2), (4) Date: Jan. 23, 2007

(87) PCT Pub. No.: WO2006/019199

PCT Pub. Date: Feb. 23, 2006

(65) Prior Publication Data

US 2007/0287039 A1    Dec. 13, 2007

(51) Int. Cl.
*H01M 16/00* (2006.01)
*H01M 8/06* (2006.01)
*H01M 8/04* (2006.01)

(52) U.S. Cl. .............................. 429/9; 429/17; 429/19; 429/21; 429/22; 429/23

(58) Field of Classification Search ........................ None
See application file for complete search history.

(56) References Cited

U.S. PATENT DOCUMENTS 3,511,710 A    5/1970 Jung et al.

(Continued)

FOREIGN PATENT DOCUMENTS

EP    1369947 A2 * 12/2003

(Continued)

OTHER PUBLICATIONS

English Language Abstract of KR 10-2004-0003658.

(Continued)

*Primary Examiner*—Melvin C Mayes
*Assistant Examiner*—Colin W Slifka
(74) *Attorney, Agent, or Firm*—Ked & Associates LLP

(57) ABSTRACT

A fuel cell system comprises: a DBFC for generating a power by receiving a fuel; a PEMFC for generating a power by receiving hydrogen, a byproduct generated at an anode of the DBFC after a reaction, as a fuel; a supplementary power partially charged by a power generated at the DBFC and the PEMFC and discharging the charged power; a load sensing unit for sensing a load connected to the DBFC, the PEMFC, and the supplementary power; and a control unit for controlling a power of the DBFC, the PEMFC, and the supplementary power according to a load sensed by the load sensing unit and thereby selectively supplying to the load. According to this, hydrogen generated at the DBFC is recycled, and a load amount is sensed thus to stably correspond to a load variation, thereby maximizing a fuel usage efficiency and stably driving the system.

17 Claims, 3 Drawing Sheets

U.S. PATENT DOCUMENTS

| | | | |
|---|---|---|---|
| 6,001,499 A | 12/1999 | Grot et al. | |
| 6,982,128 B2 * | 1/2006 | Tsang et al. | 429/19 |
| 7,241,521 B2 * | 7/2007 | Luo et al. | 429/13 |
| 2003/0143443 A1 | 7/2003 | Tsang et al. | |
| 2003/0190504 A1 | 10/2003 | Fisher et al. | |
| 2003/0235748 A1 | 12/2003 | Haltiner, Jr. et al. | |
| 2007/0048570 A1 | 3/2007 | Ko et al. | |
| 2007/0048581 A1 | 3/2007 | Hwang et al. | |
| 2007/0054161 A1 | 3/2007 | Hwang et al. | |

FOREIGN PATENT DOCUMENTS

| | | |
|---|---|---|
| JP | 49-7699 | 2/1974 |
| KR | 10-2004-0003658 | 1/2004 |

OTHER PUBLICATIONS

U.S. Appl. No. 11/538,171 to Ryoo et al., filed Oct. 3, 2006.
U.S. Appl. No. 11/548,773 to Park et al., filed Oct. 12, 2006.
U.S. Appl. No. 11/572,539, to Park et al., filed Jan. 23, 2007.
U.S. Appl. No. 11/469,644 to Hwang et al., filed Sep. 1, 2006.
U.S. Appl. No. 11/572,529 to Park et al., filed Jan. 23, 2007.

* cited by examiner

[Fig. 1]
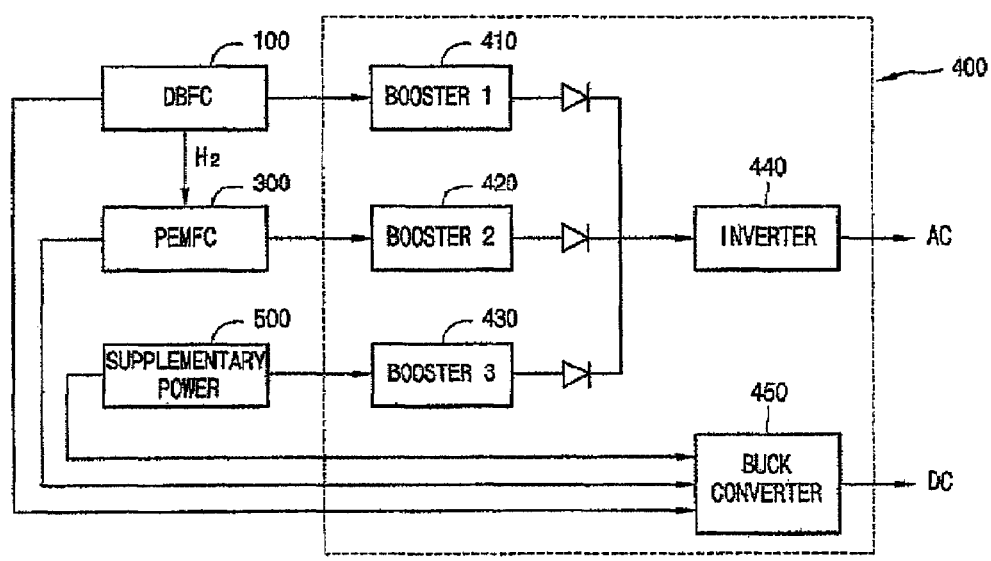
[Fig. 2]
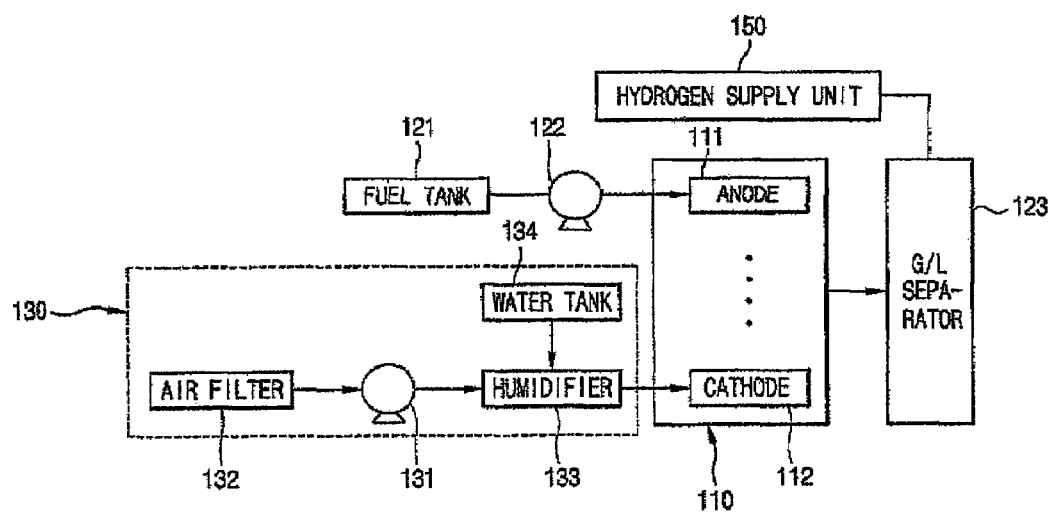

[Fig. 3]
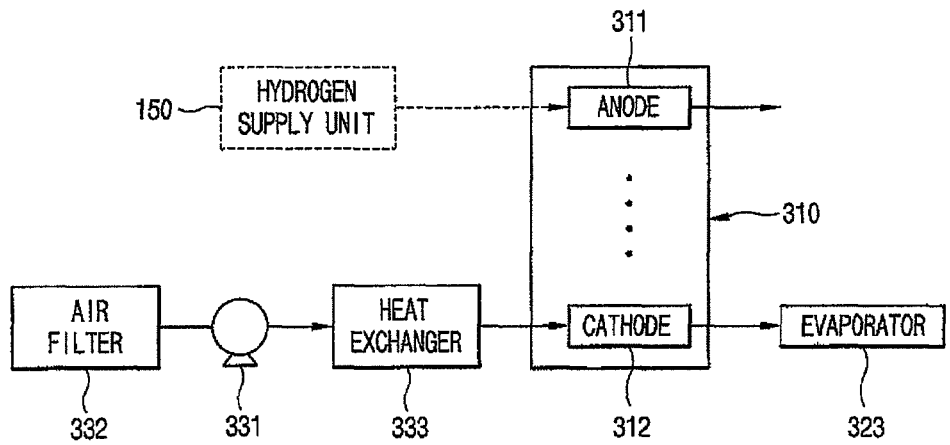
[Fig. 4]
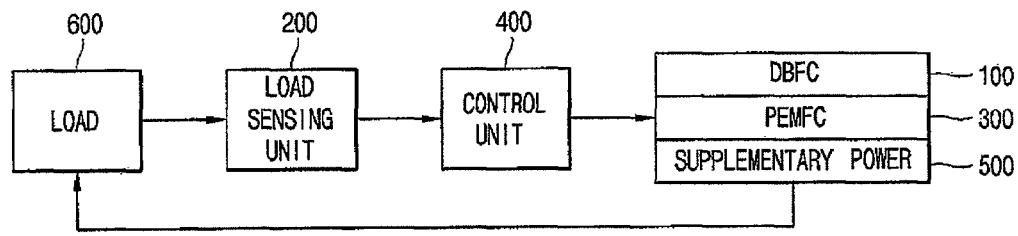
[Fig. 5]
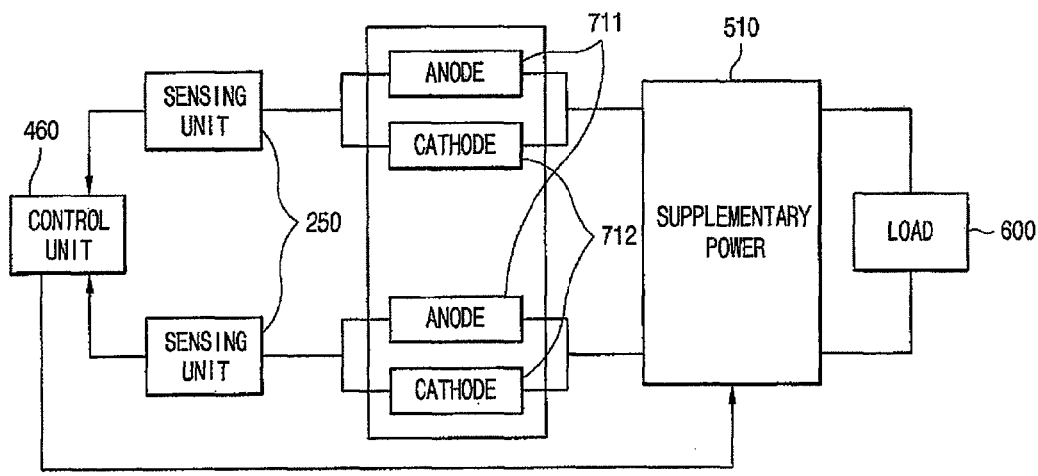

[Fig. 6]
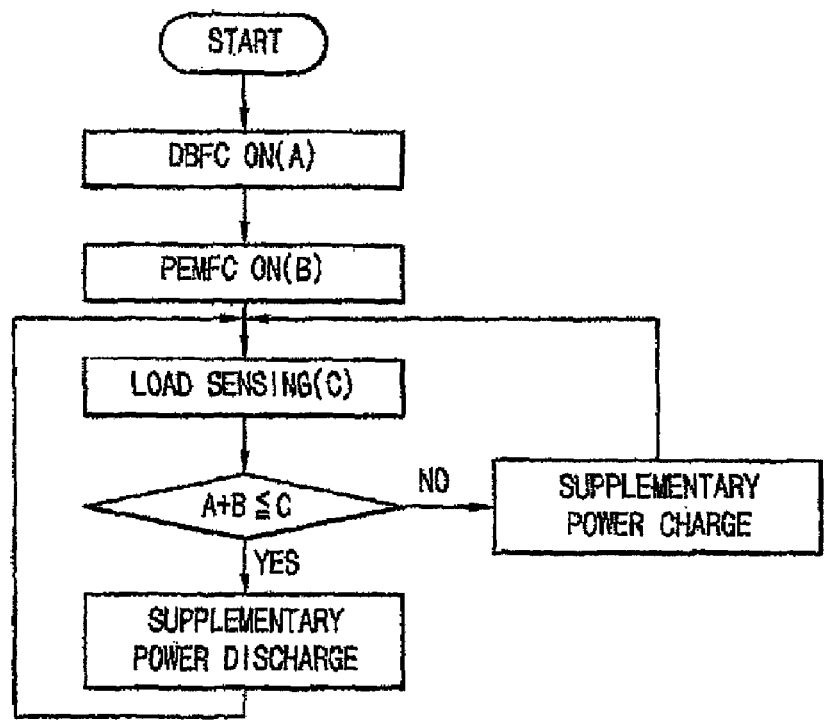
[Fig. 7]
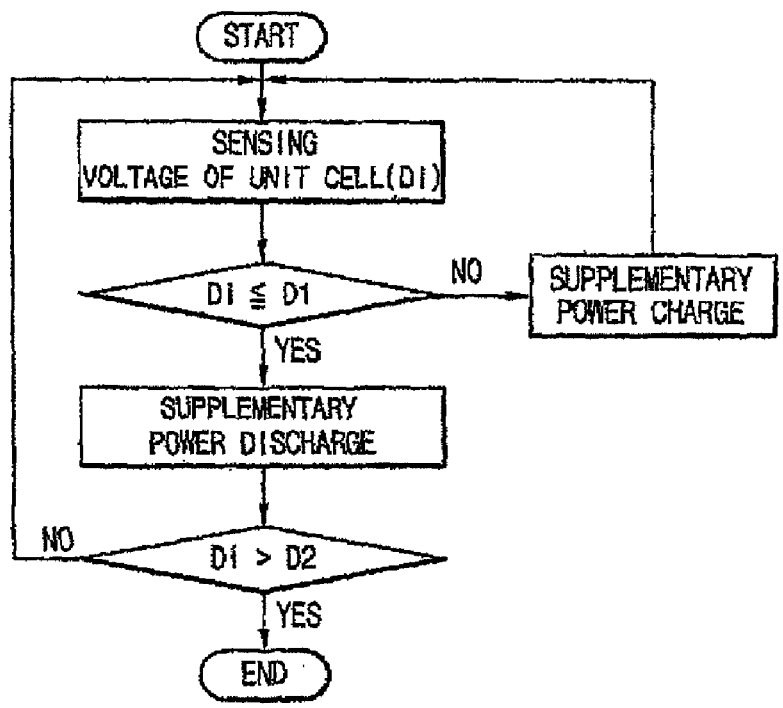

FUEL CELL SYSTEM

TECHNICAL FIELD

The present invention relates to a fuel cell system, and more particularly, to a fuel cell system capable of maximizing a fuel usage efficiency by stably corresponding to a load variation, and a controlling method thereof.

BACKGROUND ART

A fuel cell is being developed as a replacement of a fossil fuel that is not eco-friendly. Differently from a general secondary cell, the fuel cell is for directly converting an energy difference between before and after a reaction generated as hydrogen and oxygen are electrochemically reacted into electric energy without a fuel combustion (oxidation reaction) by supplying a fuel (hydrogen or hydrocarbon) to an anode and supplying oxygen to a cathode.

The fuel cell is being developed to be applied variously as a domestic fuel cell for supplying electricity to a home, a fuel cell used in an electricity car, a fuel cell used in a mobile terminal or a notebook computer, a fuel cell movable at home and supplying electricity, etc.

Especially, a fuel cell for operating home electronics or other electric devices by being moved at home or at an outdoors has to be minimized in order to be conveniently portable, and has to maximize a fuel usage efficiency under a state that the size thereof is limited.

The fuel cell includes a phosphoric acid fuel cell, an alkaline fuel cell, a proton exchange membrane fuel cell (PEMFC), a molten carbonate fuel cell, a solid oxide fuel cell, a direct methanol fuel cell, a direct borohydride fuel cell (DBFC), etc.

As a fuel of the DBFC, $KBH_4$, $NaBH_4$, etc. for decomposing hydrogen are used. In case that $NaBH_4$ is used as a fuel, electrolyte aqueous solution, NaOH or KOH, etc. is added. In case that $NaBH_4$ is used as a fuel and NaOH is used as electrolyte aqueous solution, a following reaction is performed in the anode.

$$2H_2O + NaBH_4 \rightarrow NaBO_2 + 4H_2$$

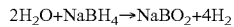

As shown in the above formula, $H_2$ is generated during a power generating process in the fuel cell. The $H_2$ having a great explosive characteristic has to be safely processed. In a fuel efficiency aspect, it is preferable to re-use said $H_2$ by recycling.

Since an amount of a load used at home or in a factory, etc. is variable, it is preferable to control a power generation amount according to the load amount.

However, controlling a power generation amount by controlling a fuel amount or a catalyst amount causes a response time to be late, thereby making a fast reaction impossible. According to this, it is impossible to react to an instantaneous drastic increase of a power thereby not to be able to supply a power stably. Also, in case that a great load is drastically applied in a no-load state, an overshooting phenomenon that a voltage is instantaneously lowered greatly at a unit cell and the lowered voltage is not recovered well is generated more distinctly than a case that a load is gradually increased. Especially, in case that a voltage deviation exists between unit cells at a stack where an anode and a cathode are stacked, a unit cell having a low voltage is greatly damaged by a very low voltage.

DISCLOSURE

Therefore, it is an object of the present invention to provide a fuel cell system capable of maximizing a fuel usage efficiency and being stably operated by stably corresponding to a load variation by sensing a load amount by recycling $H_2$ generated at a DBFC, and a controlling method thereof.

To achieve these objects, there is provided a fuel cell system comprising: a DBFC for generating a power by receiving a fuel; a PEMFC for generating a power by receiving hydrogen, a byproduct generated at an anode of the DBFC after a reaction, as a fuel; a supplementary power partially charged by a power generated at the DBFC and the PEMFC and discharging the charged power; a load sensing unit for sensing a load connected to the DBFC, the PEMFC, and the supplementary power; and a control unit for controlling a power of the DBFC, the PEMFC, and the supplementary power according to a load sensed by the load sensing unit and thereby selectively supplying to the load.

To achieve these objects, there is also provided a method for controlling a fuel cell system comprising: a first step of generating a power by driving a DBFC using a power of a supplementary power at the time of an initial system driving, and supplying hydrogen, a byproduct after a reaction to a PEMFC; a second step of geneo a PEMFC; a second step of geneMFC using hydrogen supplied in the first step; a third step of measuring a consumption power of the load that consumes a power generated at the DBFC and the PEMFC; and a fourth step of discharging the supplementary power when the consumption power of the load measured in the third step is more than a sum of the power generated at the DBFC and the PEMFC, and charging the supplementary power when the measured consumption power of the load is less than the sum of the power generated at the DBFC and the PEMFC.

DESCRIPTION OF DRAWINGS

FIG. 1 is a construction view of a fuel cell system according to an embodiment of the present invention;

FIG. 2 is a construction view showing a structure of a DBFC;

FIG. 3 is a construction view showing a structure of a PEMFC;

FIG. 4 is a flow chart showing a signal transmission order of the fuel cell system according to a first embodiment of the present invention;

FIG. 5 is a construction view showing a second embodiment of the present invention;

FIG. 6 is a flow chart of a controlling method of the fuel cell system for determining a driving method according to a first embodiment of the present invention; and FIG. 7 is a flow chart of a controlling method of the fuel cell system according to a second embodiment of the present invention.

BEST MODE

Hereinafter, a fuel cell system according to the present invention will be explained as follows with reference to the attached drawings.

FIG. 1 is a construction view of a fuel cell system according to an embodiment of the present invention.

As shown, the fuel cell system according to the present invention comprises: a DBFC 100 for generating a power by receiving a fuel; a PEMFC 300 for generating a power by receiving hydrogen, a byproduct at an anode of the DBFC 100 after a reaction, as a fuel; a supplementary power 500 partially charged by a power generated at the DBFC 100 and the PEMFC 300 and discharging the charged power; a load sensing unit (not shown) for sensing a load connected to the DBFC 100, the PEMFC 300, and the supplementary power 500; and a control unit (not shown) for controlling a power of the DBFC 100, the PEMFC 300, and the supplementary power 500 according to a load sensed by the load sensing unit and thereby selectively supplying to the load.

FIG. 2 is a construction view showing a structure of the DBFC.

As shown, the DBFC 100 includes: a fuel cell stack 110 where an anode 111 and a cathode 112 are arranged under a state that an electrolyte membrane (not shown) is disposed therebetween; a fuel tank 121 for storing a fuel; a fuel pump 122 for pumping a fuel stored in the fuel tank 121 to the anode 111 of the fuel cell stack 110; an air supply unit 130 connected to the anode 112 of the fuel cell stack 110 by an air supply line, for supplying oxygen, etc. to the cathode 112; a gas/liquid separator 123 for separating a fuel, air, and a byproduct remaining at the fuel cell stack 112 after a reaction into gas and liquid; and a hydrogen supply unit 150 for supplying hydrogen separated by the gas/liquid separator 123 to the PEMFC.

The air supply unit 130 includes: an air compressor 131 for supplying air in the atmosphere to the cathode 112 of the fuel cell stack 110; an air filter 132 for filtering air supplied to the fuel cell stack 110; a humidifier 133 for humidifying air supplied to the fuel cell stack 110; and a water tank 134 for supplying moisture to the humidifier 133.

The hydrogen supply unit 150 preferably controls hydrogen supplied to the PEMFC to be supplied with a certain amount.

As a fuel supplied to the DBFC 100, one of $NaBH_4$, $KBH_4$, $LiAlH_4$, $KH$, $NaH$, etc., and one of electrolyte aqueous solution such as $NaOH$, $KOH$, etc. can be used.

FIG. 3 is a construction view showing a structure of the PEMFC.

As shown, the PEMFC 300 includes: a fuel cell stack 310 where an anode 311 that receives hydrogen generated at the DBFC 100 and a cathode 312 are arranged under a state that an electrolyte membrane (not shown) is disposed therebetween; an air compressor 331 for supplying air in the atmosphere to the cathode 312 of the fuel cell stack 310; an air filter 332 for filtering air supplied to the fuel cell stack 310; a heat exchanger 333 for humidifying and heating air supplied to the fuel cell stack 310; and an evaporator 323 for evaporating a material remaining at the cathode 312 after a reaction.

As the supplementary power 500, any unit that can control a charging and a discharging is possible. Also, a battery or a capacitor can be used as the supplementary power. In case that the supplementary power is formed of an electric device, a fast reaction to a load variation can be performed by a control unit 400 since a time constant of the electric device is less than that of the DBFC or PEMFC that generates a power by using a general chemical reaction.

The supplementary power 500 is preferably connected to an external power of the fuel cell system thus to be charged by the external power at the time of being completely discharged.

The control unit 400 includes: boosters 410, 420, and 430 respectively connected to the DBFC 100, the PEMFC 300, and the supplementary power 500 in series, for boosting a voltage; and an inverter 440 connected to the boosters 410, 420, and 430, for converting a direct current into an alternating current.

The boosters 410, 420, and 430 preferably boost a voltage of the DBFC 100, the PEMFC 300, and the supplementary power 500 into 350V.

The inverter 440 preferably converts a voltage of 330V, a direct current, into 220V, an alternating current, that is commonly used at home.

It is preferable that the control unit 400 further includes a buck converter 450 connected to the boosters 410, 420, and 430 for converting a direct current into a direct current.

The buck converter 450 is a kind of a switched-mode power supply, and is a device for converting a DC input voltage into a voltage of a square wave by using a semi-conductor device such as a MOSFET for power, etc. as a switch, and then obtaining a DC output voltage controlled by a filter.

FIG. 4 is a flow chart showing a signal transmission order of the fuel cell system according to a first embodiment of the present invention.

A size of a load 600 connected to the DBFC 100, the PEMFC 300, and the supplementary power 500 is real-time measured by a load sensing unit 200 thus to be transmitted to the control unit 400. The control unit 400 determines a driving method of the DBFC 100, the PEMFC 300, and the supplementary power 500 according to an inputted algorithm. By the determined driving method, a power is supplied to the load 600.

FIG. 5 is a construction view showing a second embodiment of the present invention.

As shown, a second sensing unit 250 is connected to each unit cell 720 of a fuel cell stack 710 where an anode 711 and a cathode 712 are stacked, and measures a voltage of the unit cell 720.

A second control unit 460 is connected to the second sensing unit 250 thus to receive a signal. If a voltage of the unit cell is less than a preset voltage, the second control unit 460 complements a voltage by using the supplementary power 500.

A controlling method of the fuel cell system according to the first embodiment of the present invention will be explained as follows.

The method for controlling a fuel cell system comprises: a first step of generating a power by driving a DBFC using a power of a supplementary power at the time of an initial system driving, and supplying hydrogen, a byproduct after a reaction to a PEMFC; a second step of generating a power by driving the PEMFC using hydrogen supplied in the first step; a third step of measuring a consumption power of the load that consumes a power generated at the DBFC and the PEMFC; and a fourth step of discharging the supplementary power when the consumption power of the load measured in the third step is more than a sum of the power generated at the DBFC and the PEMFC, and charging the supplementary power when the measured consumption power of the load is less than the sum of the power generated at the DBFC and the PEMFC.

The first step is composed of: a power generating step for generating a power at the DBFC by using the supplementary power; and a hydrogen supplying step for supplying hydrogen generated at the DBFC after a reaction to the PEMFC.

Once the fuel cell system is operated by a user, the DBFC is operated thus to supply $NaBH_4$, etc. and electrolyte aqueous solution such as $NaOH$, etc. to an anode, and to supply oxygen-including air to a cathode. At this time, a pump arranged at the anode or a compressor arranged at the cathode is operated by using a power of the supplementary power.

According to this, a power is generated, and a byproduct such as hydrogen, etc. is generated at the DBFC after a reaction. The generated hydrogen is supplied to the PEMFC as a fuel.

The second step is for generating a power at the PEMFC by supplying hydrogen to an anode and by supplying oxygen-including air to a cathode. As a power for operating components of the PEMFC (for example, a pump or a compressor), a power generated at the DBFC and the PEMFC is partially used.

The third step is for detecting a load amount by a load sensing unit and thereby transmitting the signal to a control unit.

The fourth step is for determining a driving method of the DBFC, the PEMFC, and the supplementary power, which will be explained in more detail.

FIG. 6 is a flow chart of the controlling method of the fuel cell system for determining a driving method of the DBFC, the PEMFC, and the supplementary power according to a first embodiment of the present invention.

As shown, A denotes a power amount generated at the DBFC, B denotes a power amount generated at the PEMFC, and C denotes a measured load size. When the measure load size C is more than or the same as a sum of the power generated at the DBFC and the PEMFC (A+B), the supplementary power is discharged. Herein, an amount discharged from the supplementary power is a difference between the measured load size and the sum of the power generated at the DBFC and the PEMFC (C−(A+B)). If the measured load size C is less than the sum of the power generated at the DBFC and the PEMFC, the supplementary power is charged. Herein, a charged amount of the supplementary power is a value obtained by deducting the measured load size from the sum of the power generated at the DBFC and the PEMFC ((A+B)−C).

The charged supplementary power is used at the time of a drastic load increase, or is used to drive a component of the DBFC at the time of the initial system driving, or is used to recollect a fuel remaining at one component of the DBFC to another preset component of the DBFC.

The controlling method of the fuel cell system further comprises a fifth step of recollecting a fuel remaining at one component of the DBFC to another preset component of the DBFC by using a power of the PEMFC when the system is stopped.

NaOH, etc. used as electrolyte aqueous solution at the DFBC has a strong corrosion characteristic thus to corrode a component connection line of the DBFC. Therefore, it is necessary to recollect the NaOH, etc. to a preset component. When the system is stopped by the user, the DBFC is immediately stopped but a power can be generated at the PEMFC by using hydrogen that is not consumed yet. Therefore, it is necessary to recollect a fuel remaining at the DBFC line by using a power generated at the PEMFC, and by using the supplementary power when the power generated at the PEMFC is not sufficient.

FIG. 7 is a flow chart of the controlling method of the fuel cell system according to a second embodiment of the present invention.

The controlling method of the fuel cell system comprises: a first step of generating a power by driving a DBFC using a power of a supplementary power at the time of an initial system driving, and supplying hydrogen, a byproduct after a reaction to a PEMFC; a second step of generating a power by driving the PEMFC using hydrogen supplied in the first step; a third step of measuring a voltage of each unit cell of the DBFC and the PEMFC; and a fourth step of discharging the supplementary power for a certain time when the voltage measured in the third step is less than or the same as a preset voltage, and charging the supplementary power when the measured voltage is more than the preset voltage.

When a voltage of the unit cell is drastically lowered due to an overshooting phenomenon generated as a load is drastically increased, the voltage of the unit cell is real-time checked. If the checked voltage is less than or the same as a preset voltage value D1, the supplementary power is discharged thus to complement a voltage. On the contrary, if the voltage of the unit cell is more than D2 that is more than D1 as the temperature of the unit cell is increased after a certain time T lapses, it is judged as that the unit cell has recovered its function. According to this, the discharging of the supplementary power is stopped.

INDUSTRIAL APPLICABILITY

As aforementioned, in the fuel cell system of the present invention, hydrogen generated at the DBFC is recycled thus to restrain a discharge of the explosive hydrogen, and the supplementary power is selectively driven by detecting a load amount. According to this, it is possible to correspond to an instantaneous variation of a load and thereby to stably operate the system. Also, it is possible to correspond to a drastic load variation by using the supplementary power even under a state that a capacity of the DBFC and the PEMFC is less. According to this, a cost is reduced, and a compact system can be constructed. Additionally, a drastically decreased voltage of the unit cell due to a drastic load variation can be complemented by using the supplementary power, thereby gradually increasing a load amount.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A fuel cell system comprising:
a DBFC for generating a power by receiving a fuel;
a PEMFC for generating a power by receiving hydrogen, a byproduct generated at an anode of the DBFC after a reaction, as a fuel;
a supplementary power partially charged by a power generated at the DBFC and the PEMFC and discharging the charged power;
a load sensing unit for sensing a load connected to the DBFC, the PEMFC, and the supplementary power; and
a control unit for controlling a power of the DBFC, the PEMFC, and the supplementary power according to a load sensed by the load sensing unit, and thereby selectively supplying to the load.

2. The system of claim 1, wherein the DBFC includes:
a fuel cell stack where an anode and a cathode are arranged under a state that an electrolyte membrane is disposed therebetween;
a fuel tank for storing a fuel;
a fuel pump for pumping a fuel stored in the fuel tank to the anode of the fuel cell stack;
an air supply unit connected to the anode of the fuel cell stack by an air supply line, for supplying oxygen to the cathode;
a gas/liquid separator for separating a fuel, air, and a byproduct remaining at the fuel cell stack after a reaction into gas and liquid; and a hydrogen supply unit for supplying hydrogen separated by the gas/liquid separator to the PEMFC.

3. The system of claim 2, wherein the air supply unit includes:
an air compressor for supplying air in the atmosphere to the cathode of the fuel cell stack;
an air filter for filtering air supplied to the fuel cell stack;
a humidifier for humidifying air supplied to the fuel cell stack; and
a water tank for supplying moisture to the humidifier.

4. The system of claim 1, wherein the PEMFC includes:
a fuel cell stack where an anode that receives hydrogen generated at the DBFC and a cathode are arranged under a state that an electrolyte membrane is disposed therebetween;
an air compressor for supplying air in the atmosphere to the cathode of the fuel cell stack;
an air filter for filtering air supplied to the fuel cell stack;
a heat exchanger for humidifying and heating air supplied to the fuel cell stack; and
an evaporator for evaporating a material remaining at the cathode after a reaction.

5. The system of claim 1, wherein the load sensing unit further includes a second sensing unit connected to a unit cell of the fuel cell stack that the anode and the cathode are stacked, for sensing a voltage of the unit cell.

6. The system of claim 5, wherein the control unit further includes a second control unit connected to the second sensing unit thus to receive a signal thereof, for complementing a voltage using the supplementary power when a voltage of the unit cell is less than a preset voltage.

7. The system of claim 1, wherein the supplementary power is a capacitor.

8. The system of claim 1, wherein the supplementary power is a battery.

9. The system of claim 1, wherein the supplementary power is connected to an external power of the fuel cell system thus to be charged by the external power at the time of being completely discharged.

10. The system of claim 1, wherein a fuel supplied to the DBFC is $NaBH_4$.

11. The system of claim 1, wherein the control unit includes:
boosters respectively connected to the DBFC, the PEMFC, and the supplementary power in series, for boosting a voltage; and
an inverter connected to the boosters, for converting a direct current into an alternating current.

12. The system of claim 11, wherein the control unit further includes a buck converter connected to the boosters for converting a direct current into a direct current.

13. A controlling method of a fuel cell system comprising:
a first step of generating a power by driving a DBFC using a power of a supplementary power at the time of an initial system driving, and supplying hydrogen, a byproduct after a reaction to a PEMFC;
a second step of generating a power by driving the PEMFC using hydrogen supplied in the first step;
a third step of measuring a consumption power of a load that consumes a power generated at the DBFC and the PEMFC; and
a fourth step of discharging the supplementary power when the consumption power of the load measured in the third step is more than a sum of the power generated at the DBFC and the PEMFC, and charging the supplementary power when the measured consumption power of the load is less than the sum of the power generated at the DBFC and the PEMFC.

14. The method of claim 13, wherein the first step includes:
a power generating step for generating a power at the DBFC by using the supplementary power; and
a hydrogen supplying step for supplying hydrogen generated at the DBFC after a reaction to the PEMFC.

15. The method of claim 13 further comprising a fifth step of recollecting a fuel remaining at one component of the DBFC to another preset component of the DBFC by using a power of the supplementary power when the system is stopped.

16. The method of claim 13 further comprising a fifth step of recollecting a fuel remaining at one component of the DBFC to another preset component of the DBFC by using a power of the PEMFC when the system is stopped.

17. A controlling method of a fuel cell system comprising:
a first step of generating a power by driving a DBFC using a power of a supplementary power at the time of an initial system driving, and supplying hydrogen, a byproduct after a reaction to a PEMFC;
a second step of generating a power by driving the PEMFC using hydrogen supplied in the first step;
a third step of measuring a voltage of each unit cell of the DBFC and the PEMFC; and
a fourth step of discharging the supplementary power for a certain time when the voltage measured in the third step is less than or the same as a preset voltage, and charging the supplementary power when the measured voltage is more than the preset voltage.

* * * * *